July 27, 1926.

R. G. STANDERWICK 1,593,659

CONTROLLING MECHANISM FOR ALTERNATING CURRENT MOTORS

Filed July 30, 1925

Inventor:
Reginald G. Standerwick,
by
His Attorney.

Patented July 27, 1926.

1,593,659

UNITED STATES PATENT OFFICE.

REGINALD G. STANDERWICK, OF MARBLEHEAD, MASSACHUSETTS, ASSIGNOR TO GENERAL ELECTRIC COMPANY, A CORPORATION OF NEW YORK.

CONTROLLING MECHANISM FOR ALTERNATING-CURRENT MOTORS.

Application filed July 30, 1925. Serial No. 47,134.

The present invention relates to controlling mechanism for alternating current motors.

The primary object of the invention is to provide an improved controlling mechanism whereby an alternating current motor may be reversed as to direction of rotation and run satisfactorily in both directions without the making or breaking of any contacts.

A further object of my invention is to provide a controlling mechanism which, while accomplishing the object set forth in the preceding paragraph, at the same time will give a sensitive adjustment of speed and require but small movements in effecting such adjustments.

For a consideration of what I believe to be novel and my invention, attention is directed to the accompanying description and the claims appended thereto.

Figure 1:
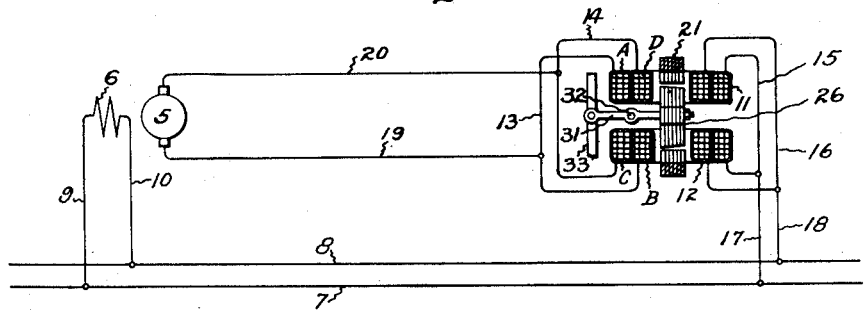
Figure 3:
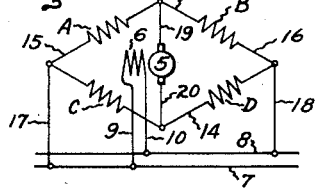
Figure 2:
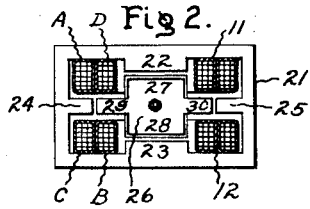
Figure 4:
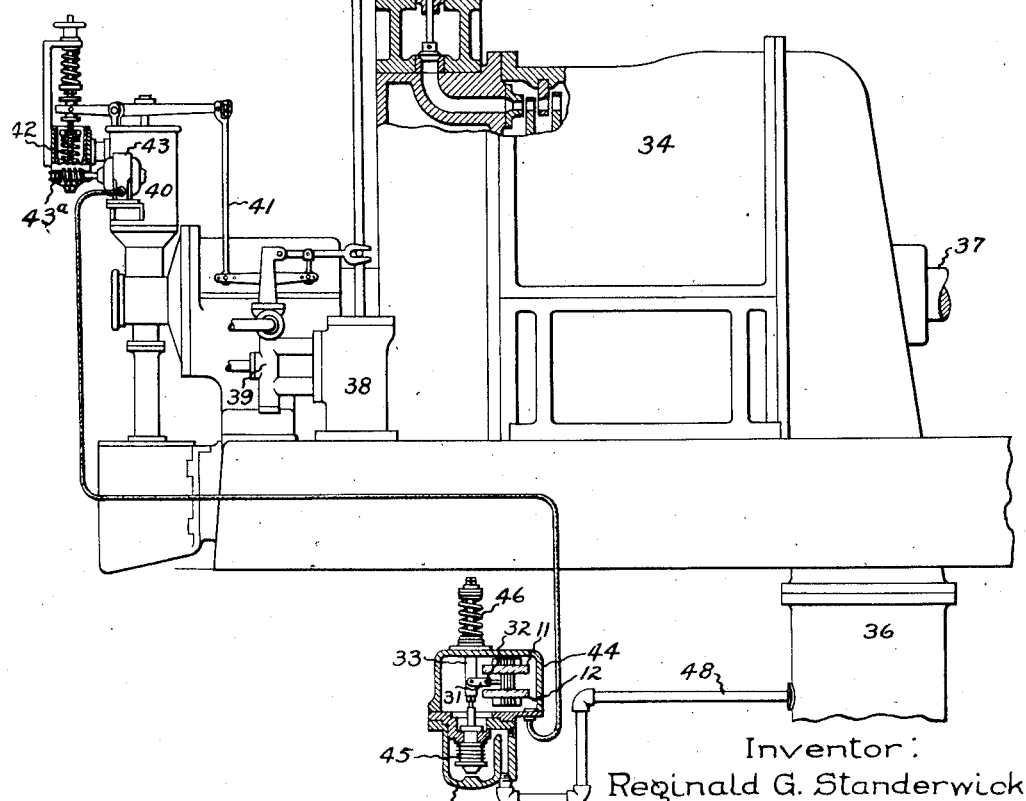

In the drawing, Fig. 1 is a diagrammatic view of a construction embodying my invention; Fig. 2 is a detail sectional view of certain parts; Fig. 3 is a wiring diagram; and Fig. 4 shows an application of the invention wherein it is utilized to control the speed of an elastic fluid turbine.

Referring to the drawing, 5 indicates the armature and 6 the field winding of an alternating current motor. It may be an alternating current motor of any suitable type wherein the direction of rotation is reversed by reversing the direction of flow of the currents in the armature and field relatively to each other, this being accomplished preferably by reversing the direction of flow of the currents in the armature relatively to those in the field. For example, a universally wound motor may be utilized. 7 and 8 indicate the two line wires of a suitable supply of alternating current, field winding 6 being connected directly across the line by conductors 9 and 10.

For controlling the direction of flow of the currents in the armature winding relatively to those in the field winding, I provide two sets of coils 11 and 12, each set comprising two windings exactly alike in all respects and wound superimposed one on the other. The two windings of set 11 are designated A and D and the two windings of set 12 are designated B and C. The winding A of set 11 is connected to the winding B of set 12 by a conductor 13, and the winding D of set 11 is connected to the winding C of set 12 by a conductor 14. The other terminals of windings A and C are connected together by a conductor 15, and the other terminals of windings B and D are connected together by a conductor 16. Conductors 15 and 16 are connected to line wires 7 and 8 by conductors 17 and 18. Windings A and B are connected thus in series to line wires 7 and 8 and windings C and D are connected likewise in series to line wires 7 and 8; and windings A, B are in parallel to windings C, D. Motor armature 5 is connected by conductors 19 and 20 to conductors 13 and 14, it being connected thus between windings A, B and windings C, D. The arrangement of the connections will be clear from the wiring diagram, Fig. 3.

Considering the wiring diagram, it will be clear that when the ratio of the impedance of winding A to the impedance of winding B equals the ratio of the impedance of winding C to the impedance of winding D, no current will flow through armature 5 but that when this condition does not obtain current will flow through armature 5 in one direction or the other depending upon the direction and amount of the unbalance. This is the well-known Wheatstone bridge arrangement.

In connection with the two sets of coils 11 and 12, I arrange a core structure which provides magnetic circuits for the windings, and I then provide means for varying the reluctance of such magnetic circuits whereby the reactance of the windings may be changed. The core structure comprises a stationary rectangular yoke 21 formed of suitable laminations and provided with four inwardly projecting poles 22, 23, 24 and 25. The two sets of coils are arranged in this yoke. In the center of the yoke is a movable plunger 26 formed of suitable laminations and having four poles 27, 28, 29 and 30 which approach poles 22, 23, 24 and 25. Plunger 26 is carried on one end of a lever 31 fulcrumed at 32, the other end being connected to some means for moving the lever, here indicated as a rod 33. By moving lever 31 on its fulcrum the widths of the air gaps between pole faces 22 and 27 and between pole faces 23 and 28 is varied. The faces of pole pieces 27 and 28 are beveled to an extent such that when brought up to the faces of pole pieces 22 and 23 they are then parallel to them. The width of the air gaps between pole faces 24 and 29 and between pole faces 25 and 30 remain constant and are made as small as practical.

In the illustrated embodiment of the invention, the four coils A, B, C and D are similar in design in every respect, coils A and D being wound superimposed and coils B and C being wound superimposed, and they are wound in directions such that the flux due to each is in a common direction.

With the above described arrangement, when plunger 26 is exactly in the center of yoke 21, the air gaps between pole pieces 22 and 27 and between pole pieces 23 and 28 are equal, and since all the windings are similar and are wound in a direction such that the flux due to each is in a common direction, there will result a magnetic field common to all four windings. This field will travel through yoke 21 and pole pieces 22, 27, 28 and 23, no flux passing through pole pieces 24, 29, 30 and 25. With this condition obtaining, the impedance of all the coils A, B, C and D will be the same and no current will flow through motor armature 5. As a result, the motor will be stationary. The design of the windings and core structure is such that under these conditions, i. e., zero potential on armature 5, but a small amount of power will be consumed in the windings. This may be accomplished by designing the structure so that the power factor, with zero potential on armature 5, is of low value.

If now the plunger 26 is moved to decrease the width of the air gap between pole pieces 22 and 27 and to increase the width of the air gap between pole pieces 28 and 23, the magnetic circuits will become unbalanced since the reluctance of the magnetic path for windings A, D will have been decreased and that for windings B, C increased. As a result, the flux created by windings A, D will be increased and that created by windings B, C will be decreased, the increased flux due to windings A, D now passing through pole pieces 24, 29 and 30, 25. It follows, therefore, that the reactance of both windings A and D is increased and the reactance of both windings B and C is decreased. The Wheatstone bridge thus becomes unbalanced, whereby a potential will be placed on motor armature 5 causing it to rotate in one direction. If plunger 26 is moved in the other direction from its neutral or central position, the same effect takes place except that the unbalancing is in the other direction and the motor armature is caused to run in the other direction. Thus by moving plunger 26 one way from central position the motor is operated in one direction and by moving plunger 26 the other way from central position, the motor is operated in the other direction, since the field is in a relatively constant direction. The amount of unbalance of the Wheatstone bridge, and hence the value of the potential imposed on motor armature 5, varies in accordance with a direct function of the amount which the plunger 26 is moved. Any motor speed in either direction from a very slow creeping movement to maximum speed can be obtained by gradually moving the plunger.

When plunger 26 is moved, the reactance of all four windings is changed, the reactance of windings A and D being changed in a direction always opposite to that of windings B and C. This means that a maximum increase in the unbalance of the bridge takes place for each increment of movement of the plunger. As a result, the motor may be operated over a wide speed range with a comparatively small total movement of the plunger.

My improved motor controlling means may be used for motor control wherever it is found applicable. One application, by way of illustration, is shown in Fig. 4, wherein it is utilized to adjust the loading spring of a turbine governor in order to regulate the valve-opening of the turbine, the specific application being in connection with a back pressure governor.

Referring to Fig. 4, 34 indicates an elastic fluid turbine provided with a valve gear 35 which regulates the flow of elastic fluid to the turbine. The exhaust conduit of the turbine is indicated at 36 and the shaft of the turbine at 37. The valve gear 35 may be of any suitable type, a known type being indicated diagrammatically in the drawing. It is adapted to be moved by a fluid-actuated motor 38, the pilot valve of which is indicated at 39. The fluid-actuated motor is controlled by a speed governor 40 driven from the shaft of the turbine and connected to the fluid-actuated motor by a link 41. 42 indicates a loading spring for governor 40, and 43 indicates an alternating current motor for varying the tension of spring 42 through the worm gearing 43ª. The arrangement illustrated is only by way of example, motor 43 representing any electric motor used to regulate the speed of a turbine.

My improved motor controlling device is indicated generally at 44 and is connected to motor 43 in accordance with the wiring arrangement shown in Fig. 1.

The operating rod 33 is connected to a bellows 45, the movement of which is opposed by a spring 46. Bellows 45 is located in a casing 47 and this casing is connected by a pipe 48 to exhaust conduit 36. The bellows 47 is thus subject to the pressure in the exhaust conduit of the turbine. It is set so that when the desired pressure obtains in conduit 36, plunger 26 of the regulating device will be held in its middle position. If, however, the pressure increases or decreases from this value, the bellows 45 will be either expanded or contracted to move plunger 26 in one direction or the other, thereby effecting movement of motor 43 in one direction or the other to vary the setting of the governor and hence the valve-opening of the turbine valve mechanism. A back pressure governor for elastic fluid turbines is well known; Fig. 4 illustrates the application of my improved motor controlling arrangement to such an apparatus.

My motor control mechanism possesses utility not only because of the fact that its operation requires the opening and closing of no contacts, which means that all contact troubles are eliminated, but also because of its great sensitiveness. The slightest movement of plunger 26 serves to unbalance the Wheatstone bridge and start the motor moving. In actual practice I have demonstrated that with a construction embodying my invention, a motor may be operated in either direction from a very slow, creeping motion to its maximum speed. A sensitive control of this character is of particular utility where comparatively fine adjustments are required. I have demonstrated also that by means of my invention, a motor may be operated through its total speed range in both directions with a comparatively small total movement of the plunger 26. This makes the mechanism particularly useful in instances, such as illustrated in Fig. 4 for example, wherein it is desired to obtain motor control in response to comparatively small initial movements.

In accordance with the provisions of the patents statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. The combination with an alternating current motor, of means for controlling it comprising four windings connected to form a Wheatstone bridge, means providing magnetic circuits for said windings, and means for varying the reluctance of said magnetic circuits, the motor armature being connected to one pair of the bridge terminals, and the other pair of bridge terminals and the motor field being connected to a source of alternating current.

2. The combination with an alternating current motor, of means for controlling it comprising four windings connected to form a Wheatstone bridge, conductors connecting the motor armature to one pair of the bridge terminals, a source of alternating current, conductors connecting the motor field and the other pair of bridge terminals to said source, a structure which provides a magnetic circuit for at least one of said windings, and means for varying the reluctance of said magnetic circuit.

3. The combination with an alternating current motor, of means for controlling it comprising four windings connected to form a Wheatstone bridge, two of said windings being superimposed on each other, conductors connecting the motor armature to one pair of the bridge terminals, a source of alternating current, conductors connecting the motor field and the other pair of bridge terminals to said source, a structure which provides a magnetic circuit for said superimposed windings, and means for varying the reluctance of said magnetic circuit.

4. The combination with an alternating current motor, of means for controlling it comprising four windings connected to form a Wheatstone bridge, the opposite windings of the bridge being superimposed on each other to form two sets of windings, conductors connecting the motor armature to one pair of the bridge terminals, a source of alternating current, conductors connecting the motor field and the other pair of bridge terminals to said source, means providing a magnetic circuit for each set of windings, and means for simultaneously varying the reluctance of said magnetic circuits in opposite directions.

5. The combination with an alternating current motor, of means for controlling it comprising a core structure, two sets of coils thereon, each set comprising two similar superimposed windings, said four windings being connected together to form a Wheatstone bridge, conductors connecting the motor armature to one pair of the bridge terminals, a source of alternating current, conductors connecting the motor field and the other pair of bridge terminals to said source, and a movable plunger associated with said core for varying the reluctance of the magnetic circuits of said windings.

6. The combination with an alternating current motor, of means for controlling it comprising a rectangular core having inwardly projecting pole pieces, two sets of coils thereon, each set comprising two similar superimposed windings, said four windings being connected together to form a Wheatstone bridge, conductors connecting the motor armature to one pair of the bridge terminals, a source of alternating current, conductors connecting the motor field and the other pair of bridge terminals to said source, and a plunger inside the core and movable relatively to its pole pieces for varying the reluctance of the magnetic circuits of said windings.

7. The combination with an alternating current motor having a field member and an armature member, of means for controlling the motor comprising four windings connected to form a Wheatstone bridge, conductors connecting one of the motor members to one pair of the bridge terminals, a source of alternating current, conductors connecting the other motor member and the other pair of bridge terminals to said source, a structure which provides a magnetic circuit for at least one of said windings, and means for varying the reluctance of said magnetic circuit.

In witness whereof, I have hereunto set my hand this 28th day of July, 1925.

REGINALD G. STANDERWICK.